(12) United States Patent
Caltagirone et al.

(10) Patent No.: US 7,979,607 B2
(45) Date of Patent: Jul. 12, 2011

(54) CASCADABLE HIGH-PERFORMANCE INSTANT-FALL-THROUGH SYNCHRONOUS FIRST-IN-FIRST-OUT (FIFO) BUFFER

(75) Inventors: Joseph Caltagirone, Tampa, FL (US); Brett D. Oliver, Tampa, FL (US); John Profumo, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 272 days.

(21) Appl. No.: 12/395,275

(22) Filed: Feb. 27, 2009

(65) Prior Publication Data
US 2010/0223405 A1 Sep. 2, 2010

(51) Int. Cl.
*G06F 3/00* (2006.01)
*G06F 13/00* (2006.01)

(52) U.S. Cl. .......................................... 710/52; 711/109
(58) Field of Classification Search .............. 710/52; 711/109
See application file for complete search history.

(56) References Cited

U.S. PATENT DOCUMENTS

| | | | |
|---|---|---|---|
| 4,839,866 A | 6/1989 | Ward et al. | |
| 5,272,675 A | 12/1993 | Kobayashi | |
| 5,305,253 A | 4/1994 | Ward | |
| 5,880,997 A * | 3/1999 | Hawkins et al. | 365/189.16 |
| 5,956,492 A | 9/1999 | Jander et al. | |
| 5,978,868 A * | 11/1999 | Maas | 710/52 |
| 6,044,030 A | 3/2000 | Zheng et al. | |
| 6,054,942 A * | 4/2000 | Stemmler | 341/58 |
| 6,118,298 A | 9/2000 | Bauer et al. | |
| 6,262,597 B1 | 7/2001 | Bauer et al. | |
| 6,323,682 B1 * | 11/2001 | Bauer et al. | 326/41 |
| 6,747,579 B1 * | 6/2004 | Ireland | 341/34 |
| 6,754,777 B1 | 6/2004 | Au et al. | |
| 7,038,952 B1 * | 5/2006 | Zack et al. | 365/189.15 |
| 2005/0223131 A1 * | 10/2005 | Goekjian et al. | 710/22 |
| 2006/0123215 A1 * | 6/2006 | Paladini et al. | 711/170 |

OTHER PUBLICATIONS

Eylon Caspi, 'Design Automation for Streaming System', Dec. 2, 2005, University of California, Berkeley.*

* cited by examiner

*Primary Examiner* — Henry W Tsai
*Assistant Examiner* — Hyun Nam
(74) *Attorney, Agent, or Firm* — Fogg & Powers LLC

(57) ABSTRACT

An apparatus and method of operating a cascadable, instant-fall-through First In, First Out (FIFO) buffer is provided. The method comprises receiving a first data element at an input of a FIFO buffer which includes a plurality of buffer slices including an output buffer slice wherein each of the plurality of buffer slices comprise a data register and a control bit register. A buffer slice is identified which is indicated for storing a data element based on a control bit register for the buffer slice and a control bit register of an adjacent buffer slice on an output side. When data is read from an output buffer slice the FIFO buffer, all data in other buffer slices are shifted down one slice closer to the output side of the FIFO buffer.

17 Claims, 5 Drawing Sheets

CASCADABLE HIGH-PERFORMANCE INSTANT-FALL-THROUGH SYNCHRONOUS FIRST-IN-FIRST-OUT (FIFO) BUFFER

GOVERNMENT LICENSE RIGHTS

The U.S. Government may have certain rights in the present invention as provided for by the terms of Government Contract #8100001270.

BACKGROUND

In high-speed data processing systems, it is often necessary to buffer data streaming between functional elements of a system. In cases where the data stream needs to arrive at its destination in the same order in which it was transmitted, a First In, First Out (FIFO) buffer is typically employed. A FIFO buffer is a type of memory that stores data serially, where the first data element read is the first data element that was stored. A FIFO buffer has an input port and an output port and can store a finite number of data items. The number of data items a FIFO buffer can store is known as the "depth." The depth of a typical FIFO buffer is generally a power of two. Input port and output port flag signals are provided by the FIFO buffer and are used to facilitate flow control of the data stream so that the FIFO buffer is not written when full or read when empty.

Typically, FIFO buffers are implemented as an addressable array of data storage registers with a write pointer and a read pointer. The input port references the write pointer to address the next available unwritten data storage register of the array and the output port references the read pointer to address the next unread data storage register of the array. The read and write pointers are initially both at the first memory location when the FIFO buffer queue is empty (as used herein, the terms "register" and "memory location" are used interchangeably). As memory locations are written, the write pointer moves to the next memory location to be written. Likewise, as memory locations are read, the read pointer moves to the next memory location to be read. A multiplexer and a counter are used to control the pointers. Utilizing a multiplexer and a counter creates additional combinational logic. This combination logic creates propagation delays, slowing down the buffer.

For the reasons stated above and for other reasons stated below which will become apparent to those skilled in the art upon reading and understanding the specification, there is a need in the art for a faster FIFO buffer which can be of any depth.

SUMMARY

The following specification provides for a cascadable, instant-fall-through First In, First Out (FIFO) memory buffer. This summary is made by way of example and not by way of limitation. It is merely provided to aid the reader in understanding some aspects of at least one embodiment described in the following specification.

Particularly, in one embodiment, a FIFO buffer is provided. The FIFO buffer comprises a plurality of buffer slices including an output buffer slice. The buffer slices each comprise a data register for storing data and a control bit register that indicates when the data register is storing data. The plurality of buffer slices is configured to shift data towards the output buffer slice based on a status of an adjacent control bit register.

In another embodiment, a method of operating a FIFO buffer is provided. The method comprising receiving a first data element at an input of a FIFO buffer, the FIFO buffer comprising a plurality of buffer slices including an output buffer slice wherein each of the plurality of buffer slices comprise a data register and a control bit register. The method further comprises identifying whether a first buffer slice is indicated for storing the first data element based on a control bit register for the first buffer slice and a control bit register of an adjacent buffer slice on an output side. Once a first buffer slice is indicated, the first data element is stored in the first buffer slice.

A further embodiment provides a processing unit interface system. The system comprises a processing unit and a FIFO buffer coupled to the processing unit, and a memory coupled to the FIFO buffer. The FIFO buffer comprises a plurality of buffer slices including an output buffer slice wherein the plurality of buffer slices shift data from their associated data register towards the output buffer slice based on a status of an adjacent control bit register. The buffer slices each comprise a data register for storing data and a control bit register that indicates when the data register is storing data.

BRIEF DESCRIPTION OF THE DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to a First In First Out (FIFO) buffer memory. Accordingly, methods and apparatus for a cascadable, instant-fall-through synchronous FIFO buffer are discussed in further detail below.

Figure 1:
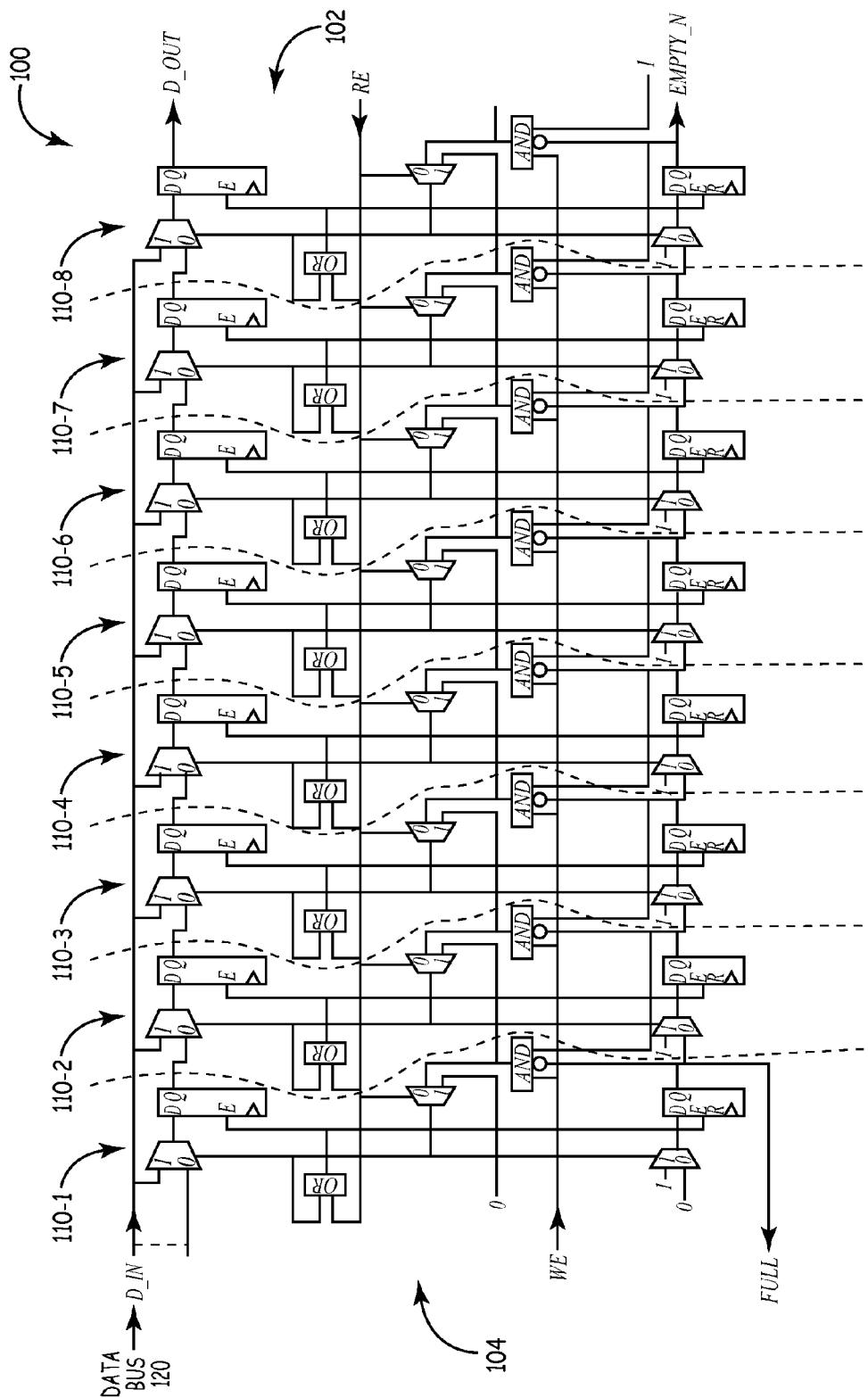
FIG. 1 is a block diagram of one embodiment of a FIFO buffer with a depth of eight.

FIG. 1 is a block diagram of one embodiment of a FIFO buffer with a depth of eight. The FIFO buffer 100 is made up of eight parallel registers 110-1 through 110-8. Each parallel register 110 is referred to herein as a buffer slice or just a slice. Therefore, the FIFO buffer 100 is eight buffer slices deep. The output side of the FIFO buffer 100 is shown at 102. The input side of the FIFO buffer 100 is shown at 104. Buffer slice 110-1 is the input slice and is generally referred to as the "first" slice because it is the first slice on the input side 104. Buffer slice 110-8 is the output slice and is generally referred to as the "last" slice because it is the furthest slice on the output side 102. Buffer slices 110-2 through 110-7 are intermediate buffer slices. A single slice 110 and its components are described in FIG. 2.

The buffer slices 110 are shift registers set up in a linear fashion which connects their inputs and outputs such that data can be shifted down the line towards the output side 102. The connection of buffer slices in this way forms the basis of the FIFO buffer being cascadable. Data is inputted from a data bus 120, and data is always written into the last unoccupied buffer slice on the output side 102. Each unoccupied buffer slice on the input side 104 is bypassed until that last unoccupied buffer slice is found, and then the data is stored in that buffer slice. The bypass feature allows the data to bypass empty slices each time data is written, speeding up the FIFO buffer. Stored data is shifted towards the output side 102 of the FIFO 100 when data is read. Because the FIFO 100 is a series of buffer slices, the last buffer slice 110-8 is the output. Thus, there is no need to multiplex the output as there is in typical FIFOs, since the data can be read directly from the output buffer slice 110-8. Not multiplexing the output improves the performance of the FIFO 100. For example, reading data from the FIFO 100 without needing to multiplex the data reduces the combinational logic required. This reduction in combinational logic increases the read speed of the FIFO 100. Due to this effect, the FIFO 100 is approximately 30% faster than typical FIFOs of comparable depth.

Figure 2:
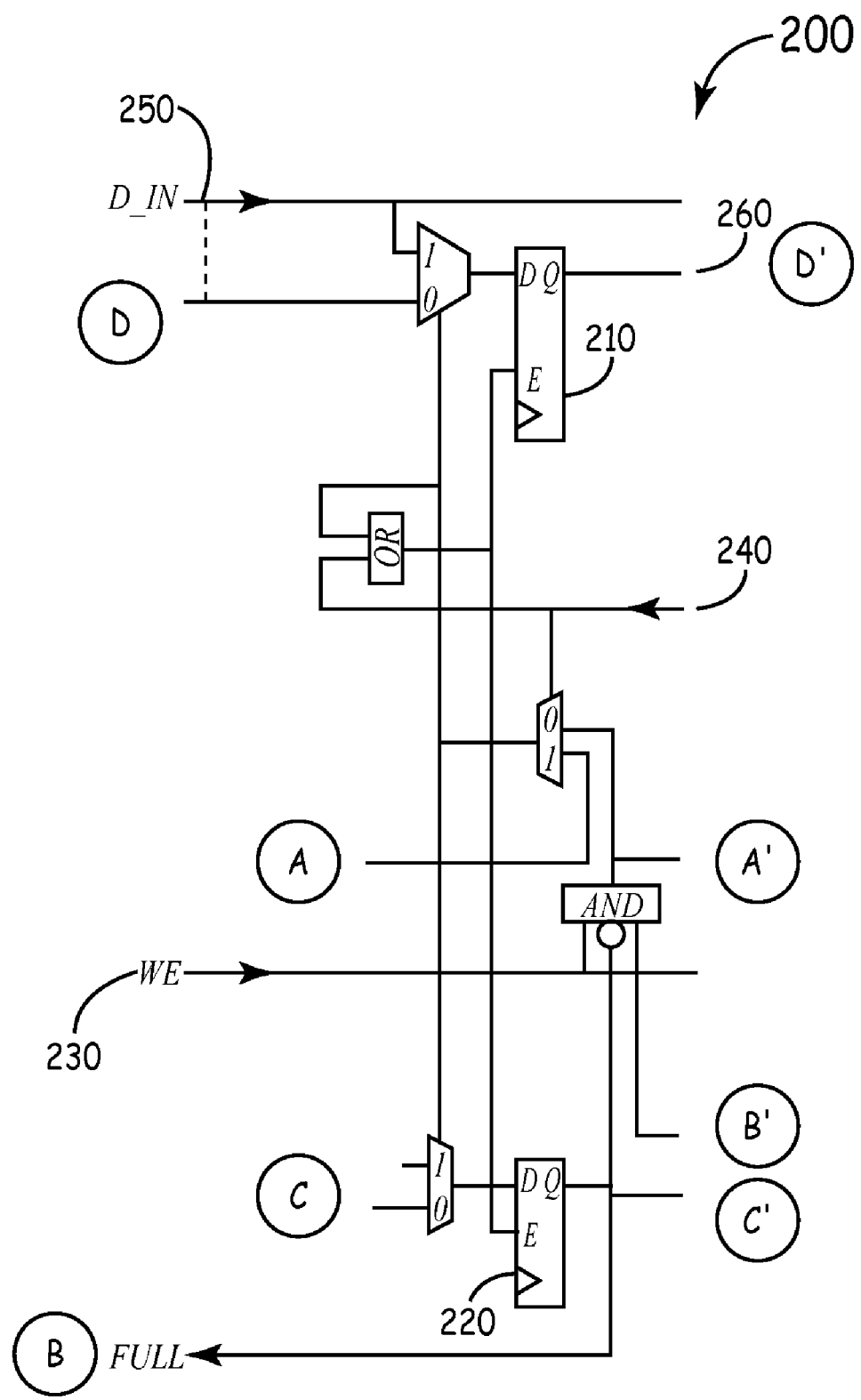
FIG. 2 is a block diagram of one embodiment of the present invention of a FIFO buffer slice.

FIG. 2 is a block diagram of an embodiment of a FIFO buffer slice 200. This slice 200 represents a FIFO buffer of depth one. A single buffer slice 200 will store one data entry. Slices 200 can be cascaded together to form a FIFO buffer of larger depth (for example, 8 slices are cascaded together to form the FIFO 100 of FIG. 1). The reference characters A, B, C, and D (and corresponding A', B', C', and D') indicate where a second slice would be connected to the first (A would be connected to A', B to B', and so forth). A and A' connect the slices together and aid in the slice shift enable. B and B' connect the slices at the control bit register, and indicate whether the control bit registers are full. C and C' also connect the slices near the control bit registers and indicate whether the control bit registers are empty. D and D' correspond to data being written in and data read out. Any number of FIFO buffer slices 200 can be connected (that is, cascaded) in this way to create a buffer of corresponding depth.

FIFO slice 200 comprises a data register 210 and a control register 220. The data register 210 is a bus of data with a width corresponding to the number of flip-flops the data bus comprises. It is to be understood that the data register 210 can be a register of any bit size. In one embodiment, the data register 210 is configured to store a data element comprising a plurality of bits. For example, in one embodiment, the data register 210 has a width of 32 bits, corresponding to 32 flip-flops. In another embodiment, the data register 210 is a 108 bit register. Typically, the width of the data register 210 will correspond to the width of the data bus to which the FIFO buffer 200 is connected. For a FIFO buffer of depth one, the input buffer slice is the same as the output buffer slice, and there are no intermediate registers.

The control register 220 is a flip-flop that indicates whether the slice 200 is full or empty. As shown in FIG. 2, the control register 220 functions as a flag indicating whether the data register 210 is holding data and may comprise a bit register. Using the control register 220 eliminates the need for read and write pointers. When data is stored in the slice 200, the control register 220 is set to indicate that the register 210 is occupied. For example, the control register 220 could be set to 1 when the data register 210 is written, and then set to 0 when the data register 210 is read. For FIFOs of depth more than one, a buffer slice's control register 220 would be set to 0 when data stored in the slice is shifted towards the output and the adjacent slice on the slice's input side was empty (that is, when no data is shifted in to replace the shifted out data). In other words, the control bit register will be reset to indicate when data is shifted out of the associated data register. The control register 220 also controls the multiplexer on the data bus as to whether to take data from the previous slice or off of the write-data input.

The slice 200 also includes a write-enable (WE) input 230 and read-enable (RE) input 240. The RE input that 240 indicates when data is read from the output register. The WE input 230 is coupled to the input register. WE 230 and RE 240 have increased load as the depth of the FIFO buffer increases. The slice 200 includes $D_{OUT}$ 260, where data is read from the FIFO buffer. The slice 200 also includes $D_{IN}$ line 250 which is the data bus for the data to be written and is coupled to the plurality of buffer slices. $D_{IN}$ line 250 was included in FIG. 2 for clarity of correlating the slice 200 to the cascaded slices in FIG. 1. However, if the FIFO buffer was only one slice deep, the slice would not be connected to a $D_{IN}$ line 250 since there is only one register to store data in. $D_{IN}$, WE, and RE are three networks that have to be distributed to all the slices in the FIFO buffer. These networks contribute to the timing of the buffer. Also, the FIFO buffer does not need any read or write pointers or counters. The FIFO buffer can be written to and read from without requiring pointers or counters.

Figure 3:
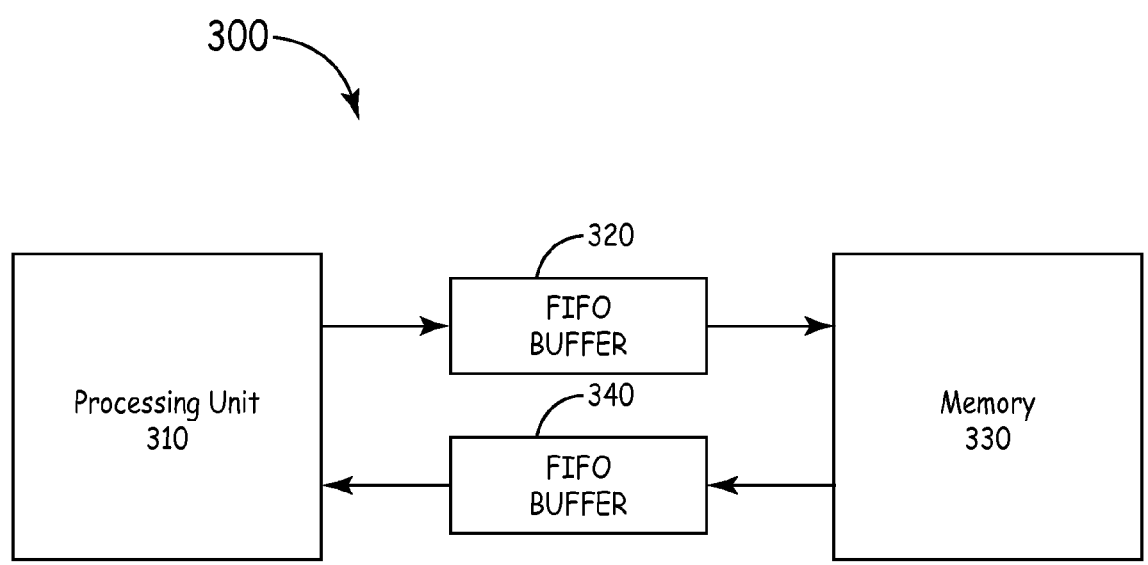
FIG. 3 is a block diagram of one embodiment of the present invention of system of a processor interface.

FIG. 3 is a block diagram of an embodiment of system 300 of a processor interface. System 300 comprises a processing unit 310, a first FIFO buffer 320, a memory 330, and a second FIFO buffer 340. The FIFO buffer 320 is coupled to the processing unit 310 and the memory 330. In the embodiment shown in FIG. 3, the first FIFO buffer 320 is connected to the output of the processing unit 310. The memory 330 is connected to the output of the first FIFO buffer 320. The input buffer slice (for example, data register 110-1 in FIG. 1) is coupled to the processing unit via a data bus. The output buffer slice (for example, data register 110-8 in FIG. 1) is coupled to the processing unit via a data bus. The memory 330 is also connected to the input of the second FIFO buffer 340. The output of the second FIFO buffer 340 is connected to the processing unit 310.

The processing unit 310 can be implemented using software, firmware, hardware, or any appropriate combination thereof, as known to one of skill in the art. By way of example and not by way of limitation, the hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA). In this exemplary embodiment, processing unit 310 includes or functions with software programs, firmware or computer readable instructions for carrying out various methods, process tasks, calculations, and control functions, used in controlling FIFO buffers 320 and 340. These instructions are typically tangibly embodied on any appropriate medium used for storage of computer readable instructions or data structures. In particular, in this embodiment, the instructions are stored on memory 330.

In alternative embodiments, the memory 330 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAM- BUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 4:
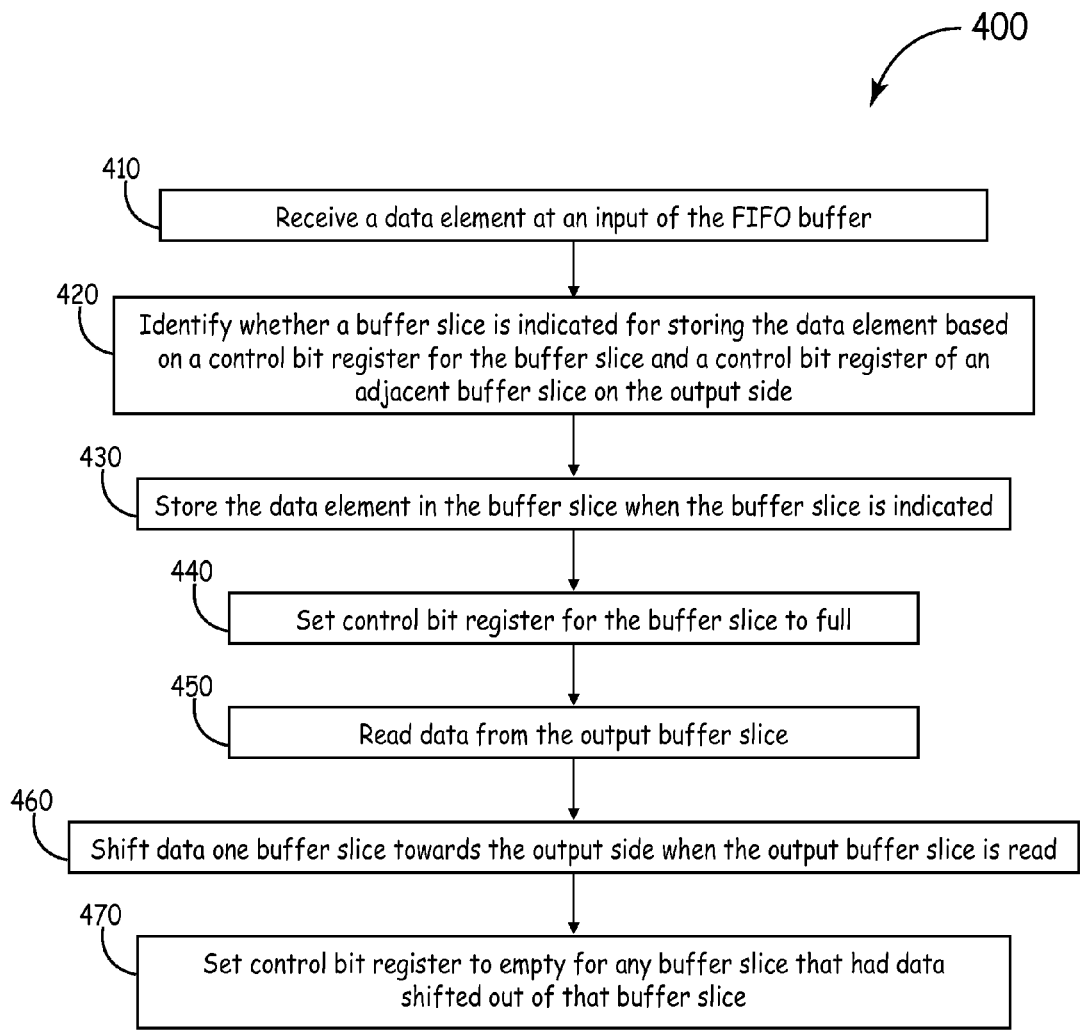
FIG. 4 is a flow diagram illustrating one embodiment of the present invention of a method of operating a buffer memory device.

FIG. 4 is a flow diagram illustrating one embodiment of the present invention of a method 400 of operating a buffer memory device. The method 400 illustrates writing and reading operations to a FIFO buffer, and it is to be understood that writing and reading operations can occur simultaneously or individually. Also, the FIFO buffer can be operated to read multiple times consecutively or to write multiple times consecutively. The method 400 illustrates a write operation and then a read operation, but can be used with any read/write combination.

The method 400 begins with receiving a first data element at an input of a FIFO buffer (block 410). The input of the FIFO buffer is from a data bus (for example, the data bus 120 of FIG. 1). If the FIFO buffer is already full, the FIFO buffer can be operable to either not store the data, or overwrite the data register with the data element. The method 400 then identifies whether a buffer slice is indicated for storing the data element based on a control bit register for the buffer slice and a control bit register of an adjacent buffer slice on an output side (block 420). A buffer slice is indicated for storing a data element when it is the last empty buffer slice on the input side of the FIFO buffer. In other words, a buffer slice is indicated for storing when that buffer slice is available for storing and the buffer slice adjacent to it on the output side is not. The method 400 queries the control bit register of the input buffer slice to determine whether it is available, and if the input buffer slice is empty, then the adjacent control bit register for the buffer slice adjacent to the input buffer slice is queried. If the adjacent control bit register indicates the adjacent buffer slice is empty, the method 400 bypasses the input buffer slice. Each buffer slice is bypassed until a control bit register indicates its corresponding buffer slice is full, then the method 400 identifies that the previous buffer slice is indicated for storing.

The data element bypasses all the empty intermediate buffer slices until the data element arrives at the first buffer slice identified as indicated for storing. The method 400 stores the data element in the identified buffer slice when the buffer slice is indicated as the next available buffer slice (block 430). Bypassing the empty buffer slices on the input side of the FIFO buffer increases the FIFO buffer's operational speed and is responsible for the instant-fall-through function. Once the first buffer slice stores the data element, the control bit register for that slice is set to full (block 440).

Figure 5:
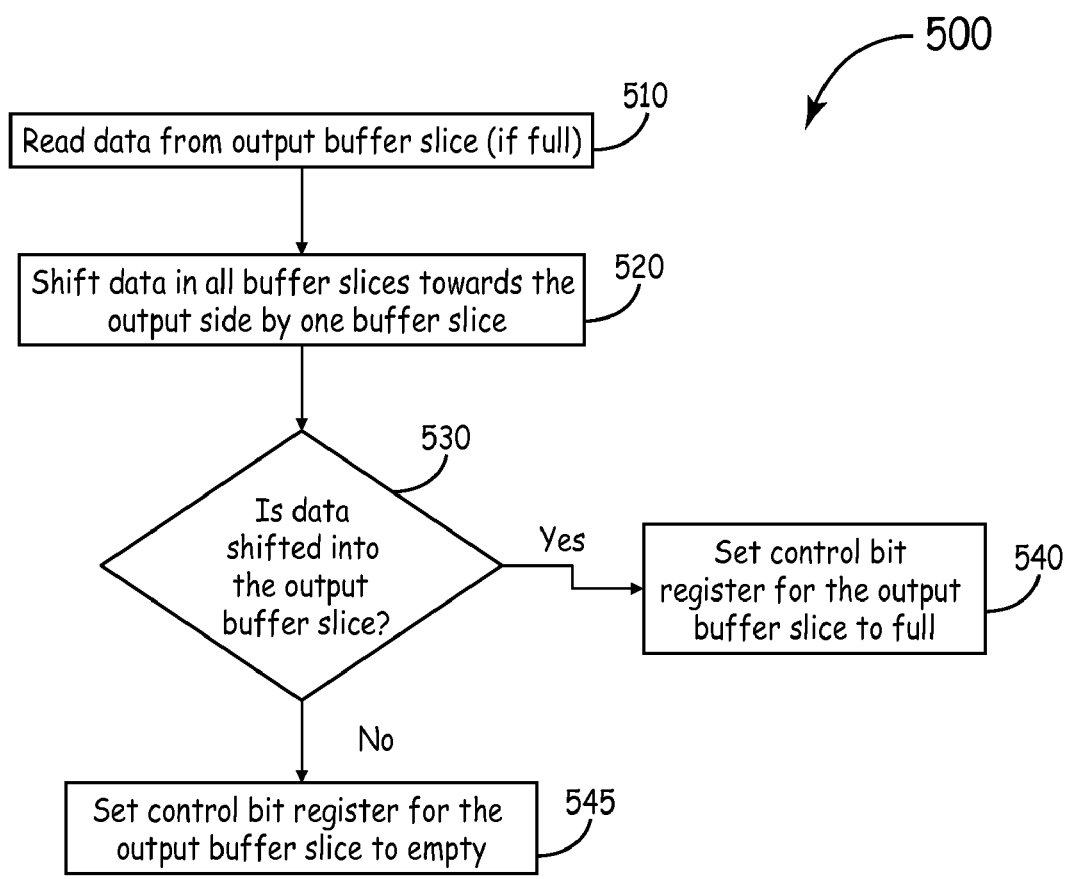
FIG. 5 is a flow diagram illustrating one embodiment of the present invention of a method of operations that illustrate reading from a buffer memory device.

Data is read from the output register (the first buffer slice on the output side of the FIFO buffer) (block 450). Whenever data is read from the output buffer slice, any data in other buffer slices is shifted one buffer slice towards the output side (block 460). Data in the full buffer slice furthest from the output side has been shifted one slice closer to the output side, and no new data has shifted into that register. The control bit register is set to empty for the buffer slice that had data shifted out but no new data shifted in to fill it (block 470). After a read operation, that buffer slice is now the first empty slice from the output side. FIG. 5, discussed below, illustrates a method for reading data from the FIFO buffer.

An example of writing data with method 400 to a cascadable, instant-fall-through FIFO buffer is illustrative. Five data elements have already been written into a FIFO buffer 8 slices deep (corresponding with FIG. 1). These five data elements have previously been stored in or shifted down to buffer slices 110-4 through 110-8. A first data element is going to be written to the FIFO buffer and is inputted on a data bus. The first buffer slice to be considered is the input buffer slice (corresponding to buffer slice 110-1 of FIG. 1). The control bit register associated with the adjacent buffer slice 110-2 is queried. In this example, slices 110-2 and 110-3 are empty. The first data element bypasses the buffer slice 110-1. Then the control bit register for slice 110-3 is queried. Buffer slice 110-3 is empty, so the buffer slice 110-2 is bypassed. Then the control bit register for buffer slice 110-4 is queried, determined to be full, so the previous buffer slice 110-3 is identified as indicated for storing. The first data element is stored in slice 110-3. The control bit register for slice 110-3 is set to full.

In another embodiment, a copy of the data remains in each buffer slice when the data is shifted. The control bit registers for the copies remain set to empty. In yet another embodiment, the data is removed from the earlier data registers. While the buffer slices contain the data, their control bit registers are set to full, but once the data is removed (through shifting), their control bit registers are set to empty.

Because the FIFO buffer does not need a write pointer (or a read pointer), the buffer avoids the propagation delays associated with pointer updating and the propagation delays of data storage register addressing at both the write and read ports. For this reason and because the propagation delay between slices is small, owing to the small amount of logic needed between each slice, the FIFO buffer can operate at a higher clock rate that does not change as the buffer depth increases. In contrast, pointer based FIFO buffers become slower as their depth increases.

Because the method 400 only looks at the status control bit register associated with an adjacent buffer slice towards the output side, the FIFO buffer has small propagation delays. This results in a FIFO buffer that has the same timing between the slices. $D_{IN}$, WE, and RE are distributed to all the slices in the buffer, and contribute to the timing of the FIFO buffer. Since there is no delay as the FIFO buffer fills due to not storing data in slices whose adjacent slice on the output side is empty, the buffer is capable of instant-fall-through.

FIG. 5 is a flow diagram illustrating one embodiment of the present invention of a method 500 of operations that illustrate reading from a buffer memory device. The method 500 always reads from the output buffer slice of the FIFO buffer (block 510). This is assuming the output buffer slice is indicated as occupied, otherwise the FIFO buffer would be empty and there would be no data to read. Always reading from the output slice decreases the combinational logic required because the data does not need to be multiplexed. Thus, the output buffer slice is always right next to the output data lines, making the buffer faster and more efficient.

Once the data is read from the output slice, all other data stored in the FIFO buffer is shifted towards the output register by one slice (block 520). In other words, a first data element is cascaded one buffer slice towards the output slice when the output slice is read. Data can be shifted in this way because the FIFO buffer is implemented as a string of bypassable register/logic stages (that is, slices) connected in series. Because this buffer is composed of replicated register/logic stages that depend only on the previous and next slices' signals, the FIFO buffer's operating frequency is not affected by increasing depth. The bypassable feature of each logic stage or slice is the basis for the "instant-fall-through" function. Once data is shifted down by one, the register that had last the data piece stored in it is now empty. That slice's control bit register is set to empty.

Once the output slice is read, the method 500 queries whether data was shifted into the output slice (block 530). If data was shifted into the output slice, the method 500 keeps or sets the control bit register associated with the output slice to full (block 540). If data was not shifted into the last slice, the method 500 sets the control bit register to empty (block 545). In this case, the FIFO buffer is now completely empty.

The methods 400 and 500 were simplified to the example where a read and write are happening at different times. The control logic directly stores data into the first unused register (from the input side), and there is no slice-to-slice propagation delay as the buffer fills (instant-fall-through). When the FIFO buffer is read, the last slice is read (the output slice), then every other data element is shifted down one slice towards the output. However, when a read and a write are happening simultaneously (that is, in one clock cycle), the process is slightly different. When both a read and write occur together, the write data replaces the data shifted out of the last previously occupied data slice. The number of occupied data slices remains the same and the control flip-flops remain the same.

Embodiments of the FIFO buffer can be used as a processor interface. The FIFO buffer buffers read/write data from the processor so the processor can do other read commands while the writes are being processed downstream (thus not holding up the processor). The FIFO buffer acts as a posted write buffer on a processor interface.

Further embodiments of the FIFO buffer system and method are implemented as a parametrizable HDL (Hardware Design Language) module for use in digital system design. Embodiments are implemented when synthesized for configuration of FPGAs (Field Programmable Gate Array) or for the physical circuit layout with an ASIC (Application Specific Integrated Circuit).

In one embodiment, the FIFO buffer slices are easily connected, thus the FIFO buffer comprises cascadable shift registers. Reduced combinational logic on the output side increases the speed and performance of the FIFO buffer. Each slice in the FIFO buffer is bypassable. Since each slice is bypassable, the buffer is capable of instant-fall-through.

This description has been presented for purposes of illustration, and is not intended to be exhaustive or limited to the embodiments disclosed. Variations and modifications may occur, which fall within the scope of the following claims. Therefore, it is manifestly intended that this invention be limited only by the claims and the equivalents thereof.

What is claimed is:

1. A method of operating a First In First Out (FIFO) buffer, the method comprising:
   receiving a first data element at an input of a FIFO buffer, the FIFO buffer comprising a plurality of buffer slices including an output buffer slice wherein each of the plurality of buffer slices comprise a data register and a control bit register;
   identifying whether a first buffer slice is indicated for storing the first data element based on a control bit register for the first buffer slice and a control bit register of an adjacent buffer slice on an output side; and
   storing the first data element in the first buffer slice when the first buffer slice is indicated while bypassing any non-indicated buffer slices;
   wherein storing the first data element in the first buffer slice further comprises bypassing either the first buffer slice or at least one intermediate buffer slice, wherein the at least one intermediate buffer slice is positioned between the input of the FIFO buffer and the output buffer slice.

2. The method of claim 1, further comprising indicating the output buffer slice for storing when a control bit register for the output buffer slice is indicated as empty.

3. The method of claim 1, further comprising:
   setting a first control bit register of the first buffer slice of the plurality of buffer slices to indicate when data is stored in an associated first data register of the first buffer slice; and
   resetting the first control bit register to indicate when data is shifted out of the associated first data register.

4. The method of claim 1, wherein identifying whether a first buffer slice is indicated for storing the first data element further comprises:
   determining the status of a first buffer slice by querying a control bit register associated with the first buffer slice;
   determining the status of a second buffer slice by querying a control bit register associated with the second buffer slice, wherein the second buffer slice is adjacent to the first buffer slice on the output side; and
   identifying the first buffer slice as indicated for storing when the status of the second buffer slice is indicated as full.

5. The method of claim 1, further comprising shifting the first data element one buffer slice towards the output register when the output register is read.

6. The method of claim 1, further comprising:
   querying a control bit register for the adjacent buffer slice to determine a status of the adjacent buffer slice; and
   when the control bit register for the adjacent buffer slice indicates that the adjacent buffer slice is empty, storing the first data element into the adjacent buffer slice.

7. A First In First Out (FIFO) buffer, the FIFO buffer comprising:
   a plurality of buffer slices sequentially coupled in a cascading configuration including an output buffer slice, the buffer slices each comprising:
   a data register for storing data; and
   a control bit register that indicates when the data register is storing data;
   wherein the plurality of buffer slices shift data towards the output buffer slice based on a status of an adjacent control bit register; and
   a data input line coupled to each data register of the plurality of buffer slices, wherein when data is received on the data input line for storage, the data is stored in a last non-occupied buffer slice by bypassing any preceding non-occupied buffer slices;
   wherein a first control bit register indicates an associated data register is full when a data element is stored in the associated data register and indicates the associated data register is empty when the data element is shifted out of the associated data register.

8. The FIFO buffer of claim 7, further comprising:
   wherein the last non-occupied buffer slice is identified based on the status of an adjacent data register on an output side of a FIFO buffer; and
   wherein a first data element is stored in the last non-occupied buffer slice.

9. The FIFO buffer of claim 7, further comprising wherein a first data register of a first buffer slice of the plurality of buffer slices is configured to shift a first data element to a second data register of an adjacent second buffer slice based on a status of a control bit register associated with the second data register.

10. The FIFO buffer of claim 7, wherein the plurality of buffer slices further comprise one or more intermediate buffer slices positioned between an input buffer slice and the output buffer slice.

11. The FIFO buffer of claim 7, further comprising
a read enable input that indicates when data is read from the output buffer slice; and
a write enable input coupled to an input buffer slice.

12. The FIFO buffer of claim 7, wherein each data register in the plurality of buffer slices is configured to store a data element comprising a plurality of bits.

13. A processing unit interface system, the system comprising:
a processing unit;
a First In First Out (FIFO) buffer coupled to the processing unit, wherein the FIFO buffer comprises:
a plurality of buffer slices consecutively coupled in a cascaded fashion including an output buffer slice, the buffer slices each comprising:
a data register for storing data; and
a control bit register that indicates when the data register is storing data;
wherein the plurality of buffer slices shift data from their associated data register towards the output buffer slice based on a status of an adjacent control bit register; and
a data input line coupled to each data register of the plurality of buffer slices, wherein when data is received on the data input line for storage, the data is stored in a last non-occupied buffer slice by bypassing any preceding non-occupied buffer slices;
a memory coupled to the FIFO buffer;
wherein the FIFO buffer is configured to:
identify a last non-occupied buffer slice based on the status of an adjacent buffer slice on an output side of the FIFO buffer; and
store a first data element in the last non-occupied buffer slice.

14. The system of claim 13, wherein the FIFO buffer further comprises one or more intermediate buffer slices, wherein the one or more intermediate buffer slices can be bypassed and are positioned between an input register and the output register.

15. The system of claim 13, wherein the FIFO buffer is configured to:
shift at least a first data element one buffer slice towards the output buffer slice when the output buffer slice is read.

16. The system of claim 13, wherein an input buffer slice is coupled to the processing unit via a data bus.

17. The system of claim 13, wherein the output buffer slice is coupled to the memory via a data bus.

* * * * *